(12) United States Patent
Shim et al.

(10) Patent No.: US 10,063,683 B2
(45) Date of Patent: Aug. 28, 2018

(54) IN-VEHICLE MULTIMEDIA SYSTEM CONNECTED TO EXTERNAL DEVICE AND CONTROL METHOD THEREOF

(71) Applicant: Hyundai Motor Company, Seoul (KR)

(72) Inventors: Kyu Dae Shim, Seoul (KR); Nam Kwon Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 149 days.

(21) Appl. No.: 14/938,237

(22) Filed: Nov. 11, 2015

(65) Prior Publication Data

US 2016/0191689 A1 Jun. 30, 2016

(30) Foreign Application Priority Data

Dec. 24, 2014 (KR) ........................ 10-2014-0188473

(51) Int. Cl.

| | | |
|---|---|---|
| *G06F 9/54* | (2006.01) | |
| *H04M 1/725* | (2006.01) | |
| *H04B 1/3822* | (2015.01) | |
| *H04M 1/60* | (2006.01) | |
| *H04L 12/26* | (2006.01) | |
| *H04W 4/80* | (2018.01) | |
| *H04L 12/24* | (2006.01) | |

(52) U.S. Cl.
CPC ........ *H04M 1/7253* (2013.01); *H04B 1/3822* (2013.01); *H04L 41/0816* (2013.01); *H04L 43/0811* (2013.01); *H04M 1/6091* (2013.01); *H04W 4/80* (2018.02); *H04L 41/22* (2013.01)

(58) Field of Classification Search
CPC ......... H04L 67/10; H04M 1/6091; G06F 9/54

USPC ............................... 709/202; 455/557; 701/1
See application file for complete search history.

(56) References Cited

U.S. PATENT DOCUMENTS

| | | | |
|---|---|---|---|
| 8,726,155 B2 | 5/2014 | Fang et al. | |
| 9,858,211 B2* | 1/2018 | Kim ...................... | G06F 13/102 |
| 2013/0166097 A1* | 6/2013 | Ricci ........................ | G06F 9/54 |
| | | | 701/1 |

(Continued)

FOREIGN PATENT DOCUMENTS

| | | |
|---|---|---|
| EP | 2 537 700 A1 | 12/2012 |
| JP | 2004-114801 A | 4/2004 |

(Continued)

OTHER PUBLICATIONS

Kia Motors America, Incorporated, "2013 Sorento Owener's Manuel" 2012.*

*Primary Examiner* — William D Cumming
(74) *Attorney, Agent, or Firm* — Mintz Levin Cohn Ferris Glovsky and Popeo, P.C.; Peter F. Corless

(57) ABSTRACT

A method for efficiently setting an external device to execute an interworking function in an in-vehicle multimedia system and a method for performing the same are provided. The method includes connecting at least one external device to the in-vehicle multimedia system and then detecting a number of connected external devices. Upon detecting that the number of connected external devices is one, the one external device is set as a default device to execute the interworking function. Upon detecting judging that the number of connected external devices is multiple, a pop-up window is displayed to select one of the plurality of external devices on a display, and the external device selected through the pop-up window is set as the default device.

18 Claims, 4 Drawing Sheets

(56) References Cited

U.S. PATENT DOCUMENTS

| | | | | |
|---|---|---|---|---|
| 2013/0304795 | A1* | 11/2013 | Kang | ............... H04L 67/10 |
| | | | | 709/202 |
| 2014/0114501 | A1 | 4/2014 | Chang et al. | |
| 2016/0191689 | A1* | 6/2016 | Shim | ............... H04M 1/6091 |
| | | | | 455/557 |

FOREIGN PATENT DOCUMENTS

| | | | |
|---|---|---|---|
| JP | 2007-011380 A | 1/2007 |
| JP | 2012-046099 A | 3/2012 |
| JP | 2014-150431 A | 8/2014 |
| JP | 2014-233019 A | 12/2014 |
| KR | 10-2009-0010692 A | 1/2009 |
| KR | 10-2012-0008833 A | 2/2012 |

* cited by examiner

IN-VEHICLE MULTIMEDIA SYSTEM CONNECTED TO EXTERNAL DEVICE AND CONTROL METHOD THEREOF

CROSS REFERENCE TO RELATED APPLICATION(S)

This application claims the benefit of Korean Patent Application No. 10-2014-0188473, filed on Dec. 24, 2014, which is hereby incorporated by reference as if fully set forth herein.

BACKGROUND

Field of the Invention

The present invention relates to a method for efficiently setting an external device to execute an interworking function in an in-vehicle multimedia system and a method for performing the same.

Discussion of the Related Art

Recently, smart devices which share or reproduce various types of content, such as moving pictures, music, images and the like, between multimedia devices are being developed. Thereby, vehicles have functions of interworking with a smart device, such as a smartphone, and outputting content, acquired from the smartphone or stored in advance in the smartphone, through an in-vehicle multimedia system (e.g., Pandora®, Aha™ radio and the like).

Instead of conventional wireless communication techniques, e.g., BLUETOOTH, based on the increase in the number of universal serial bus (USB) ports within a vehicle a plurality of external devices may be simultaneously connected to the vehicle. Therefore, among the connected external devices, a device which will execute the above-described interworking function requires set up and management.

However, in the existing system of the related art, a device which will execute the interworking function is detected by a connection method regardless of which device which a user intends to connect to a vehicle. Such a system will be described with reference to FIG. 1. FIG. 1 is a view illustrating an exemplary general external device connection unit of a vehicle according to the related art. With reference to FIG. 1, the vehicle is provided with a wireless communication module 110 that supports Wi-Fi (e.g., wireless) and/or BLUETOOTH connection and USB ports 150 respectively installed at front and rear seats of a vehicle. In such a vehicle, when an interworking function is executed, connection via the USB port 150 is generally prioritized over connection via wireless communication.

For example, it is assumed that a passenger in the seat next to a driver connects a smartphone to a USB port to charge the smartphone battery when the driver connects a smartphone to a vehicle via BLUETOOTH for a hands-free function. In particular, a user intends to execute an interworking function using a smartphone connected via BLUETOOTH, but a device connected to the USB port has priority and thus the corresponding function is executed through the device connected to the USB port not the smartphone connected via BLUETOOTH connection based on a command to execute the interworking function.

SUMMARY

Accordingly, the present invention is directed to an in-vehicle multimedia system connected to an external device and a control method thereof that substantially obviate one or more problems due to limitations and disadvantages of the related art. An object of the present invention is to provide an in-vehicle multimedia system which may more efficiently set a device to execute an interworking function and a control method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of an in-vehicle multimedia system configured to execute an interworking function with an external device connected thereto may include connecting at least one external device to the in-vehicle multimedia system, detecting the number of the at least one connected external device, in response to detecting that the number of the at least one connected external device is one, setting the one external device as a default device to execute the interworking function, in response to detecting that the number of the at least one connected external device is a plurality of devices, displaying a pop-up window to select one of the plurality of external devices on a display, and setting the external device selected through the pop-up window as the default device.

In another aspect of the present invention, an in-vehicle multimedia system configured to execute an interworking function with an external device connected thereto may include a display, a wireless communication unit, a wired connection unit, and a controller configured to detect the number of at least one connected external device connected to the in-vehicle multimedia system via at least one of the wireless communication unit and the wired connection unit, in response to detecting that the number of the at least one connected external device is one, to set the one external device as a default device to execute the interworking function, in response to detecting that the number of the at least one connected external device is a plurality of devices, to display a pop-up window to select one of the plural external devices on the display, and to set the external device selected through the pop-up window as the default device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
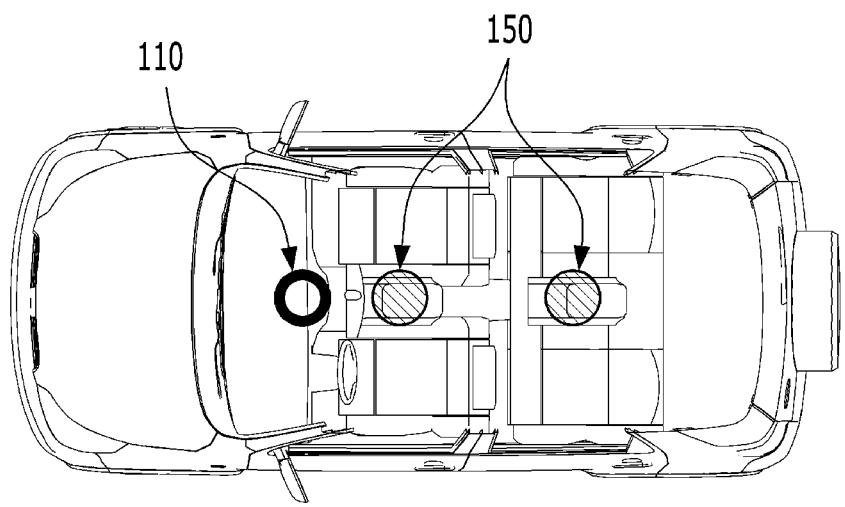
FIG. 1 is a view illustrating an exemplary general external device connection unit of a vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. In the drawings, the same or similar elements are denoted by the same reference numerals even though they are depicted in different drawings, and a detailed description thereof will be omitted. The suffixes "module" and "unit" in elements used in the description below are given or used together only in consideration of ease in preparation of the specification and do not have distinctive meanings or functions.

In the following description of exemplary embodiments of the present invention, a detailed description of known functions and configurations incorporated herein will be omitted when it may make the subject matter of the present invention rather unclear. Further, the accompanying drawings have been made only for a better understanding of the embodiments of the present invention. It will be appreciated that the technical spirit disclosed in the specification is not restricted by the accompanying drawings and includes various modifications, equivalents, and substitutions, without departing from the scope and spirit of the invention as disclosed in the accompanying claims.

Hereinafter, among devices connected to a vehicle, a device recognized as a device which will execute an interworking function in an in-vehicle multimedia system when a command to execute the above-described interworking function is input will be referred to as a "default device", for convenience of description.

One exemplary embodiment of the present invention proposes that, regardless of connection methods in execution of the interworking function in an in-vehicle multimedia system, when one device is connected to a vehicle, the corresponding device may be set as a default device and, when a specific condition, such as change of a device connection state, is generated, a pop-up window which allows a user to set one of the devices currently connected to the vehicle as a default device is displayed. In particular, the specific condition may include 1) after a device is initially connected to the vehicle, another device is additionally connected to the vehicle, or 2) after connection of a set default device is released, the interworking function is executed under the condition that a plurality of devices are connected to the device remains.

Figure 2:
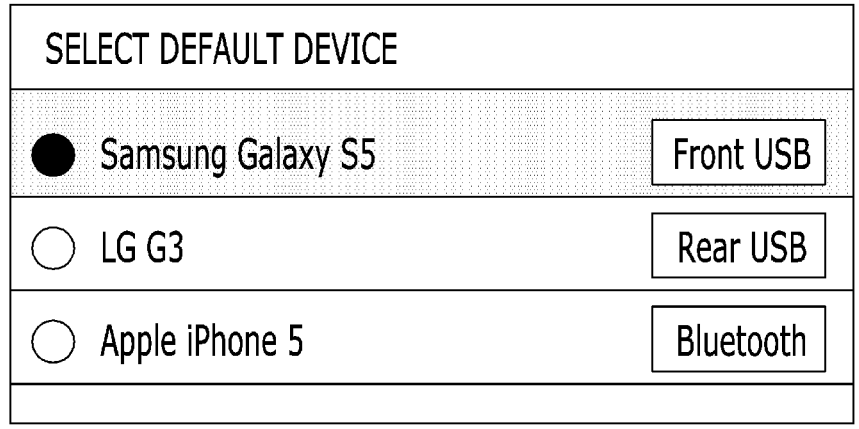
FIG. 2 is a view illustrating an exemplary pop-up window for setting a default device in accordance with one exemplary embodiment of the present invention.

FIG. 2 is a view illustrating an exemplary pop-up window for setting a default device in accordance with one exemplary embodiment of the present invention. With reference to FIG. 2, names of devices connected to a vehicle and connection methods/positions thereof may be displayed on the pop-up window. Particularly, the names of the devices are exemplary and may be replaced with device model names, MAC addresses, unique device identifiers, device recognition identifiers according to respective communication methods and the like. Such a pop-up window may be displayed on a display of an in-vehicle AVN system.

The pop-up window may be immediately displayed when release of connection of the default device to the vehicle occurs, or may not be displayed at a point of time when release of connection of the default device to the vehicle occurs and may be displayed when the interworking function is executed. The latter may prevent inconvenience generated when a pop-up window is displayed although the driver releases connection of a smartphone to the vehicle to take the smartphone when the driver exits the vehicle.

An initially connected device may be set as a default device when an in-vehicle multimedia system (i.e., a head unit or an audio video navigation (AVN) system) recognizes the connected device, when the corresponding device is connected to a vehicle via a USB port, and may be set as a default device when pairing and a related profile are prepared, when the corresponding device is connected to the vehicle via BLUETOOTH. In particular, the in-vehicle multimedia system may identify connected devices based on identification information of the respective devices (e.g., BD-ADDR, device names displayed when connected to the vehicle using the USB port, MAC addresses of wireless modems and the like).

Furthermore, when a connected device does not provide a USB storage device function or the interworking function, the pop-up window may not be displayed. When only one connected device does not provide such a function, an error pop-up window indicating such a fact may be displayed to a user via a display. Hereinafter, pop-up window display conditions and default device setting criteria will be described in more detail with reference to Table 1.

TABLE 1

| | Number of connected devices | |
|---|---|---|
| | Single | Plural |
| When device is initially connected or interworking function is initially executed | No display of pop-up window (currently connected device is default device) | Display of pop-up window |
| When interworking function is executed after device connection state is changed under condition that connection of default device is maintained | No display of pop-up window (setting of default device is maintained) | No display of pop-up window (setting of default device is maintained) |
| When interworking function is executed after default device is removed | No display of pop-up window (remaining device is default device) | Display of pop-up window |

With reference to Table 1, when a single (e.g., one) device is connected to a vehicle, a pop-up window may not be displayed and the currently connected device may be set as a default device. Although one device is connected to the vehicle, when the corresponding device does not provide the interworking function, a pop-up window indicating such a fact may be displayed. When the interworking function is initially executed under the condition that a plurality of devices are connected to the vehicle, a pop-up window may be displayed and, although a plurality of devices are connected while the default device is maintained, a pop-up window may not be displayed. Further, when the interworking function is executed under the condition that a plurality of devices are connected to the vehicle after the default device is removed, a pop-up window to set a default device may be displayed.

Figure 3:
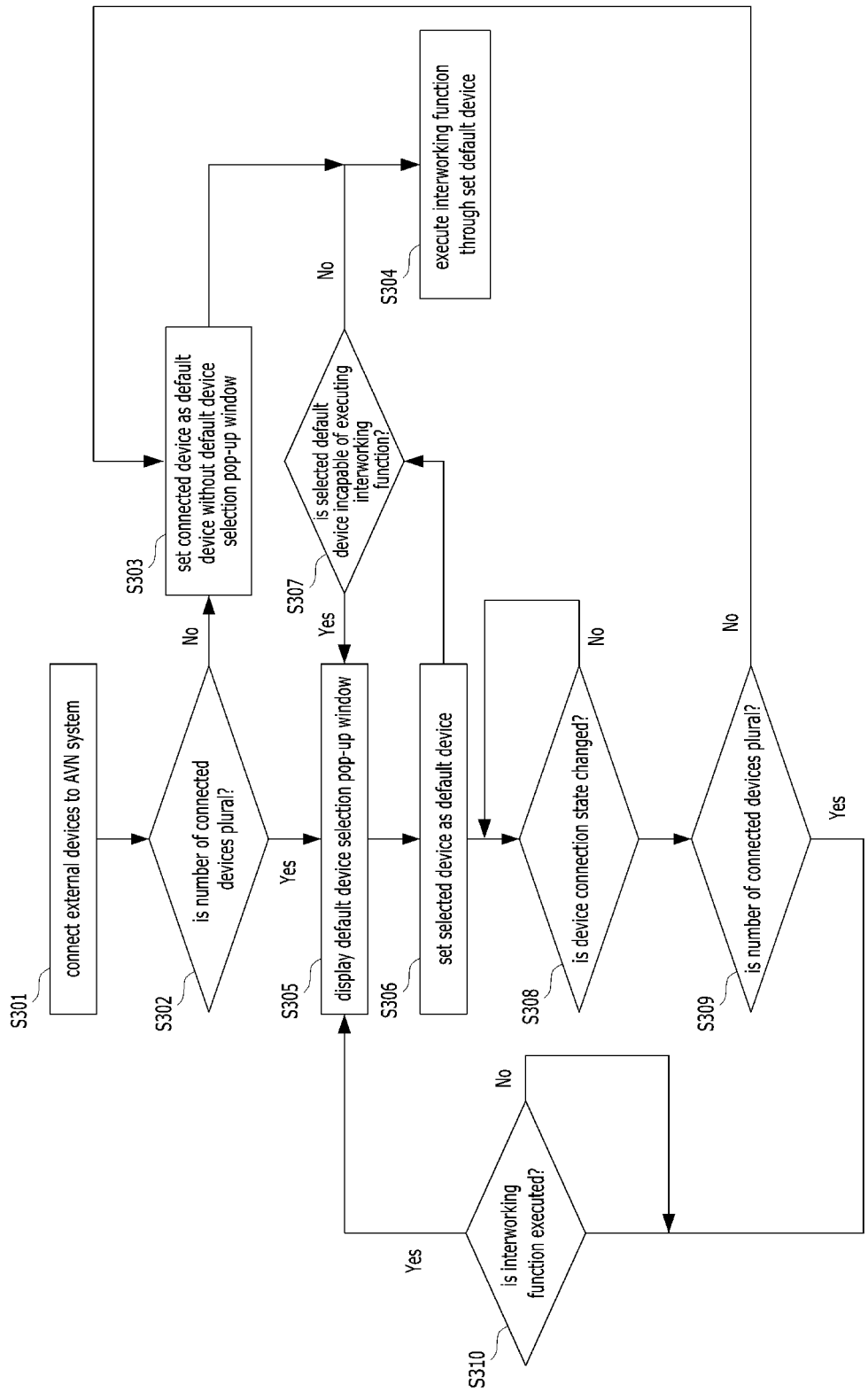
FIG. 3 is a flowchart illustrating an exemplary process of setting a default device in an in-vehicle multimedia system in accordance with one exemplary embodiment of the present invention.

The operating conditions of Table 1 are illustrated in FIG. 3. FIG. 3 is a flowchart illustrating an exemplary process of setting a default device in an in-vehicle multimedia system in accordance with one exemplary embodiment of the present invention. With reference to FIG. 3, external devices may be connected to an in-vehicle AVN system (Operation S301). The AVN system may be executed by a controller having a processor and a memory. Such connection may be connection via USB ports or connection via a wireless communication method, such as BLUETOOTH or Wi-Fi. The AVN system may be configured to determine whether the number of connected devices is plural (Operation S302), and, when one device is connected to the in-vehicle AVN system, the AVN system may be configured to set the connected device as a default device (Operation S303). Thereafter, when an interworking function execution command is input, the in-vehicle AVN system may be configured to execute the interworking function through the set default device (Operation S304).

When a plurality of devices are connected to the in-vehicle AVN system, a default device selection pop-up window may be displayed (Operation S305) and, when a user selects one of the plurality of devices using the pop-up window, the selected device may be set as a default device (Operation S306). When the selected default device is capable of executing the interworking function (Operation S307), the pop-up window may be displayed again (Operation S305).

Further, the in-vehicle AVN system may be executed by a controller to sense whether the device connection state is changed after setting of the default device (Operation S308). As a result of sensing whether the device connection state is changed, when only one device remains, the in-vehicle AVN system may be configured to set the corresponding device as a default device regardless of whether the corresponding device has been set in advance as the default device (Operation S303).

When a plurality of devices are connected to the in-vehicle AVN system based on a change of the device connection state (Operation S309), the in-vehicle AVN system may be configured to determine whether an interworking function execution command is input (Operation S310) and display a default device selection pop-up window upon determining that the interworking function execution command is input (Operation S305). Although the device connection state may be changed and a plurality of devices may be connected to the in-vehicle AVN system after the change of the device connection state, when the device, set in advance as the default device, is connected to the in-vehicle AVN system, the pop-up window may not be displayed.

Figure 4:
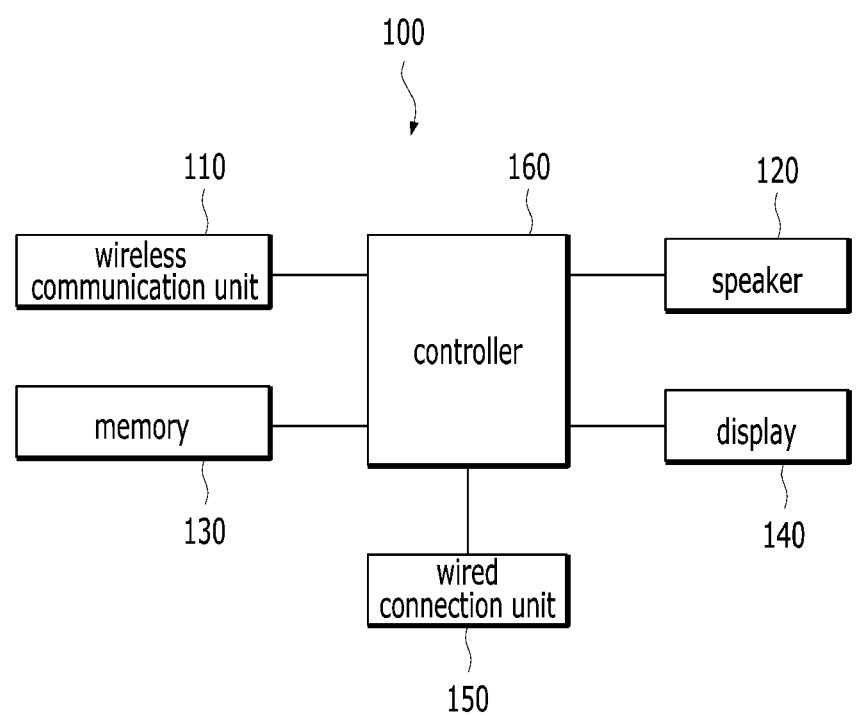
FIG. 4 is a block diagram illustrating an exemplary configuration of an in-vehicle audio-video-navigation (AVN) system in accordance with one exemplary embodiment of the present invention.

Through the above-described method, a user may conveniently set a default device regardless of connection methods (e.g., regardless of a connection type). Thereafter, the configuration of an apparatus for implementing exemplary embodiments of the present invention will be described. FIG. 4 is a block diagram illustrating the configuration of an in-vehicle AVN system in accordance with one exemplary embodiment of the present invention.

With reference to FIG. 4, an in-vehicle audio video navigation system (AVN) system 100 may include a wireless communication unit 110 connected to an external device, such as a smartphone, configured to execute an interworking function through a wireless communication method, such as BLUETOOTH or Wi-Fi, to perform data exchange, a speaker 120 configured to output sound of content output when the interworking function is executed, related sound when a navigation function is executed, and/or telephone voice of a counterpart when a hands-free function is executed, a memory 130 configured to store map information for a navigation system, multimedia content, default device setting information and the like, a display 140 configured to visually output a pop-up window to set a default device, map information for the navigation system, image information of multimedia content and the like, a wired connection unit 150, such as a USB port, connected to the external device, such as a smartphone, configured to execute the interworking function by wires to perform data exchange, and a controller 160 configured to operate the above-described elements. For example, the controller 160 may be configured to determine the connection state of external devices or whether a default device is set and execute the overall process, such as whether a pop-up window based on a change of the connection state is displayed and change of setting of the default device, as exemplarily shown in FIG. 3.

As apparent from the above description, at least one exemplary embodiment of the present invention has effects below.

An external device which will execute an interworking function may be more efficiently set. Particularly, although a plurality of external devices may be connected to a vehicle, an external device configured to execute the interworking function may be set based on user intention regardless of connection methods.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A control method of an in-vehicle multimedia system configured to execute an interworking function with an external device connected thereto, comprising:
   connecting at least one external device to the in-vehicle multimedia system;
   determining, by a controller, a number of connected external devices;
   in response to determining that the number of connected external devices is one, setting, by the controller, the one external device as a default device to execute the interworking function;
   in response to determining that the number of connected external devices is multiple, controlling, by the controller, a display so as to display a pop-up window to select one of the plurality of external devices;
   setting, by the controller, the external device selected through the pop-up window as the default device;
   sensing, by the controller, whether a connection state of the plurality of external devices is changed when the plurality of external devices are connected to the in-vehicle multimedia system; and
   changing, by the controller, the setting of the default device based on whether the connection state of the plurality of external devices is changed,
   wherein the pop-up window is not displayed at a point of time when the connection of the default device to the in-vehicle multimedia system is released and is displayed when the interworking function is executed.

2. The control method according to claim 1, wherein the connection of the at least one external device to the in-vehicle multimedia system is via a wired connection using a universal serial bus (USB) port or a wireless connection.

3. The control method according to claim 1, wherein, when one external device remains as a result of sensing a changed state, the change of the setting of the default device includes setting the remaining external device as the default device regardless of a formerly set default device.

4. The control method according to claim 1, wherein, when a plurality of external devices remains as a result of the sensing, the change of the setting of the default device includes:
   when the plural external devices include a formerly set default device, maintaining the formerly set default device as the default device; and
   when the plural external devices do not include the formerly set default device, displaying the pop-up window.

5. The control method according to claim 1, wherein the displaying of the pop-up window on the display is executed when a command to execute the interworking function is input.

6. The control method according to claim 1, wherein, when the external device selected through the pop-up window is not set as the default device, the display of the pop-up window on the display is repeated.

7. The control method according to claim 1, further comprising:
   displaying, by the controller, an error pop-up window on the display, when the one external device is incapable of executing the interworking function.

8. The control method according to claim 1, wherein the pop-up window includes at least one of identification information and connection methods of the plurality of external devices.

9. The control method according to claim 1, wherein the interworking function has a function of outputting content, acquired via the default device or stored in advance in the default device, through the in-vehicle multimedia system.

10. An in-vehicle multimedia system configured to execute an interworking function with an external device connected thereto, comprising:
    a display;
    a wireless communication unit;
    a wired connection unit; and
    a controller operably coupled to the display, the wireless communication unit, and the wired connection unit, the controller configured to:
    detect a number of connected external devices connected to the in-vehicle multimedia system via at least one of the wireless communication unit and the wired connection unit;
    in response to detecting that the number of connected external devices is one, set the one external device as a default device to execute the interworking function;
    in response to detecting that the number of connected external devices is multiple, control the display so as to display a pop-up window to select one of the plurality of external devices;
    set the external device selected through the pop-up window as the default device;
    sense whether a connection state of the plurality of external devices is changed when the plurality of external devices are connected to the in-vehicle multimedia system; and
    change a setting of the default device based on whether the connection state of the plurality of external devices is changed,
    wherein the pop-up window is not displayed at a point in time when the connection of the default device to the in-vehicle multimedia system is released and is displayed when the interworking function is executed.

11. The in-vehicle multimedia system according to claim 10, wherein:

the wireless communication unit is configured to support wireless connection; and the wired connection unit includes at least one universal serial bus (USB) port.

12. The in-vehicle multimedia system according to claim 10, wherein when one external device remains as a result of the sensing of the changed state, the controller is configured to set the remaining external device as the default device regardless of a formerly set default device.

13. The in-vehicle multimedia system according to claim 10, wherein when a plurality of external devices remains as a result of the sensing of the changed state, the controller is configured to, when the plural external devices include a formerly set default device, maintain the formerly set default device as the default device and, when the plural external devices do not include the formerly set default device, display the pop-up window.

14. The in-vehicle multimedia system according to claim 10, wherein the controller is configured to display the pop-up window on the display when a command to execute the interworking function is input.

15. The in-vehicle multimedia system according to claim 10, wherein the controller is configured to, when the external device selected through the pop-up window may not be set as the default device, again display the pop-up window on the display.

16. The in-vehicle multimedia system according to claim 10, wherein the controller is configured to display an error pop-up window on the display, when the one external device is incapable of executing the interworking function.

17. The in-vehicle multimedia system according to claim 10, wherein the pop-up window includes at least one of identification information and connection methods of the plural external devices.

18. The in-vehicle multimedia system according to claim 10, wherein the interworking function has a function of outputting content, acquired through the default device or stored in the default device, through the in-vehicle multimedia system.

* * * * *